(12) United States Patent
Iso

(10) Patent No.: US 6,741,962 B2
(45) Date of Patent: May 25, 2004

(54) SPEECH RECOGNITION SYSTEM AND STANDARD PATTERN PREPARATION SYSTEM AS WELL AS SPEECH RECOGNITION METHOD AND STANDARD PATTERN PREPARATION METHOD

(75) Inventor: Kenichi Iso, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/093,110

(22) Filed: Mar. 7, 2002

(65) Prior Publication Data

US 2002/0128835 A1 Sep. 12, 2002

(30) Foreign Application Priority Data

Mar. 8, 2001 (JP) ........................................ 2001-064286

(51) Int. Cl.[7] .............................................. G10L 17/00
(52) U.S. Cl. ...................... 704/247; 704/220; 704/238; 704/207; 704/268; 704/203; 704/253; 704/223
(58) Field of Search ................................ 704/220, 238, 704/207, 247, 268, 203, 253, 223

(56) References Cited

U.S. PATENT DOCUMENTS

| | | | | |
|---|---|---|---|---|
| 4,881,266 A | * | 11/1989 | Nitta et al. ................. | 704/253 |
| 5,455,888 A | * | 10/1995 | Iyengar et al. .............. | 704/203 |
| 5,581,652 A | * | 12/1996 | Abe et al. .................... | 704/220 |
| 5,799,276 A | * | 8/1998 | Komissarchik et al. ..... | 704/207 |
| 5,950,153 A | * | 9/1999 | Ohmori et al. .............. | 704/217 |
| 5,978,759 A | * | 11/1999 | Tsushima et al. ........... | 704/223 |
| 6,236,964 B1 | * | 5/2001 | Tamura et al. .............. | 704/238 |
| 6,539,355 B1 | * | 3/2003 | Omori et al. ................ | 704/268 |

FOREIGN PATENT DOCUMENTS

| | | |
|---|---|---|
| EP | 0911807 A2 | 4/1999 |
| JP | 62-37795 | 8/1987 |
| JP | 7-98599 | 4/1995 |
| JP | 3110105 | 9/2000 |
| JP | 2000-244653 | 9/2000 |
| JP | 2000-250577 | 9/2000 |

OTHER PUBLICATIONS

J. Epps & W.H. Holmes, "*A New Technique for Wideband Enhancement of Coded Narrowband Speech*", Speech Coding Proceedings, 1999 IEE Workshop on Porvoo, Finland, Jun. 20–23, 1999, Piscataway, NJ, USA, IEEE, US, Jun. 20, 1999, pp. 174–176.

* cited by examiner

Primary Examiner—Richemond Dorvil
Assistant Examiner—Qi Han
(74) Attorney, Agent, or Firm—Scully, Scott, Murphy & Presser

(57) ABSTRACT

A speech recognition system for recognizing an input voice of a narrow frequency band. The speech recognition system includes: a frequency band converting unit for converting the input voice of the narrow frequency band into a pseudo voice of a wide frequency band which covers an entirety of the narrow frequency band and which is wider than the narrow frequency band.

4 Claims, 6 Drawing Sheets

SPEECH RECOGNITION SYSTEM AND STANDARD PATTERN PREPARATION SYSTEM AS WELL AS SPEECH RECOGNITION METHOD AND STANDARD PATTERN PREPARATION METHOD

BACKGROUND OF THE INVENTION

1. Field of the Invention

The present invention relates to a speech recognition system and a standard pattern preparation system for preparing standard patterns to be used for the speech recognition process by the speech recognition system as well as a method of preparing the standard patterns and a computer program for preparing the standard patterns, and more particularly to a speech recognition system for recognizing a narrow-band frequency speech such as a telephone speech recognition.

2. Description of the Related Art

FIG. 1 is a block diagram illustrative of the conventional speech recognition system. The conventional speech recognition system includes a characteristic extraction unit 100 and a pattern reference unit 103. The characteristic extraction unit 100 receives an input of a voice 105 and converts the voice into a characteristic vector time series. The pattern reference unit 103 receives the characteristic vector time series and compares the characteristic vector time series with a standard pattern 104 for the speech recognition before the pattern reference unit 103 outputs a speech recognition result 106. This conventional speech recognition system is addressed in 1995, entitled "the fundamentals of the voice recognition" NTT Advanced Technology.

A melcepstrum characteristic extraction may be available for the characteristic extraction unit 100. The characteristic extraction unit 100 further includes a power spectrum calculation unit 101 for calculating a power spectrum in a short term of the input voice 105 and a melcepstrum calculation unit 102 receiving the power spectrum from the power spectrum calculation unit 101 and performing a mel conversion and a cosine conversion of a logarithm of the power spectrum, thereby extracting a melcepstrum characteristic quantity.

FIG. 2 is a block diagram illustrative of a conventional standard pattern preparation system. The conventional standard pattern preparation system prepares the above described standard pattern 104 to be referred by the above described conventional speech recognition system shown in FIG. 1. The conventional standard pattern preparation system includes a characteristic extraction unit 200 and a standard pattern preparation unit 204. The characteristic extraction unit 200 further includes a power spectrum calculation unit 201 for calculating a power spectrum in a short term of a learning voice signal from a learning voice storing unit 203, and a melcepstrum calculation unit 202 receiving the power spectrum from the power spectrum calculation unit 201 and performing a mel conversion and a cosine conversion of a logarithm of the power spectrum, thereby extracting a melcepstrum characteristic quantity.

The standard pattern preparation unit 204 receives the melcepstrum characteristic quantity from the melcepstrum calculation unit 202 and prepares a standard pattern. The standard pattern is stored in a standard pattern storing unit 205.

With reference again to FIG. 1 the process for recognition of the narrow band frequency voice such as the telephone voice by the conventional speech recognition system will be described.

The telephone voice has a narrow frequency band, and is likely to receive a substantive influence by noises, for which reason it is generally difficult to recognize the voice. The frequency band of the telephone voice is ranged from 300 Hz to 3400 Hz. A first formant of the vowel or the primary characteristic frequency region is important for the speech recognition. This first formant of the vowel or the primary characteristic frequency region exists under 300 Hz, depending on a speaker. In this case, the voice signal entered from the telephone terminal may be free of the first formant of the vowel or the primary characteristic frequency region under 300 Hz.

A frequency range of the friction noise may often be over 3000 Hz. In this case, the voice signal entered from the telephone terminal may be free of the friction noise.

The restriction on the frequency band causes that the recognition of the telephone voice with the narrow frequency band is lower in accuracy than the recognition of the microphone voice with a wide frequency band.

Japanese laid-open patent publication No. 2000-250577 discloses the following conventional technique for improving the frequency characteristic of the voice with the narrow frequency band entered from the microphone. This conventional technique prevents any lack of the voice information and also improves the speech recognition characteristic in the presence of the noises. A characteristic vector is selected by a first code book from a voice input pattern as received by a second voice receiver. A correction vector is selected from a second code book in correspondence with the index of the selected vector. Both the characteristic vector and the correction vector are then added to presume the characteristic vector of the voice received by the second receiver which ensures a higher voice-receiving sensitivity in a wide frequency band than the first receiver.

In the above circumstances, the development of a novel speech recognition system is desirable.

SUMMARY OF THE INVENTION

Accordingly, it is an object of the present invention to provide a novel recognition system free from the above problems.

It is a further object of the present invention to provide a novel recognition system exhibiting such a high performance of speech recognition in a narrow frequency band as closely to the performance in the narrow frequency band.

It is a still further object of the present invention to provide a novel standard pattern preparation system for preparing standard patterns to be used for the speech recognition process by the speech recognition system free from the above problems.

It is yet a further object of the present invention to provide a novel standard pattern preparation system for preparing standard patterns to be used for the speech recognition process by the speech recognition system exhibiting such a high performance of speech recognition in a narrow frequency band as closely to the performance in the narrow frequency band.

It is yet a further object of the present invention to provide a method of preparing the standard patterns free from the above problems.

It is yet a further object of the present invention to provide a method of preparing the standard patterns exhibiting such a high performance of speech recognition in a narrow frequency band as closely to the performance in the narrow frequency band.

It is yet a further object of the present invention to provide a computer program for preparing the standard patterns free from the above problems.

It is yet a further object of the present invention to provide a computer program for preparing the standard patterns exhibiting such a high performance of speech recognition in a narrow frequency band as closely to the performance in the narrow frequency band.

The present invention provides a speech recognition system for recognizing an input voice of a narrow frequency band. The speech recognition system includes: a frequency band converting unit for converting the input voice of the narrow frequency band into a pseudo voice of a wide frequency band which covers an entirety of the narrow frequency band and which is wider than the narrow frequency band.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Figure 1:
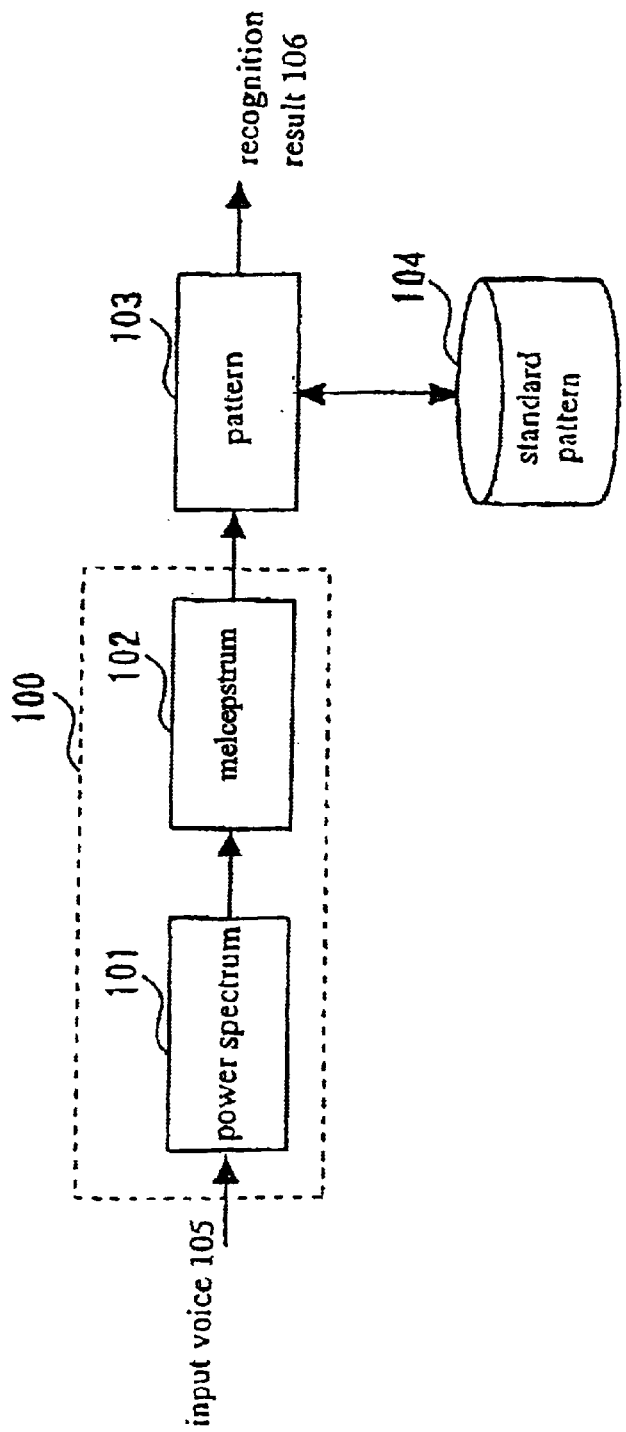
FIG. 1 is a block diagram illustrative of the conventional speech recognition system.
Figure 2:
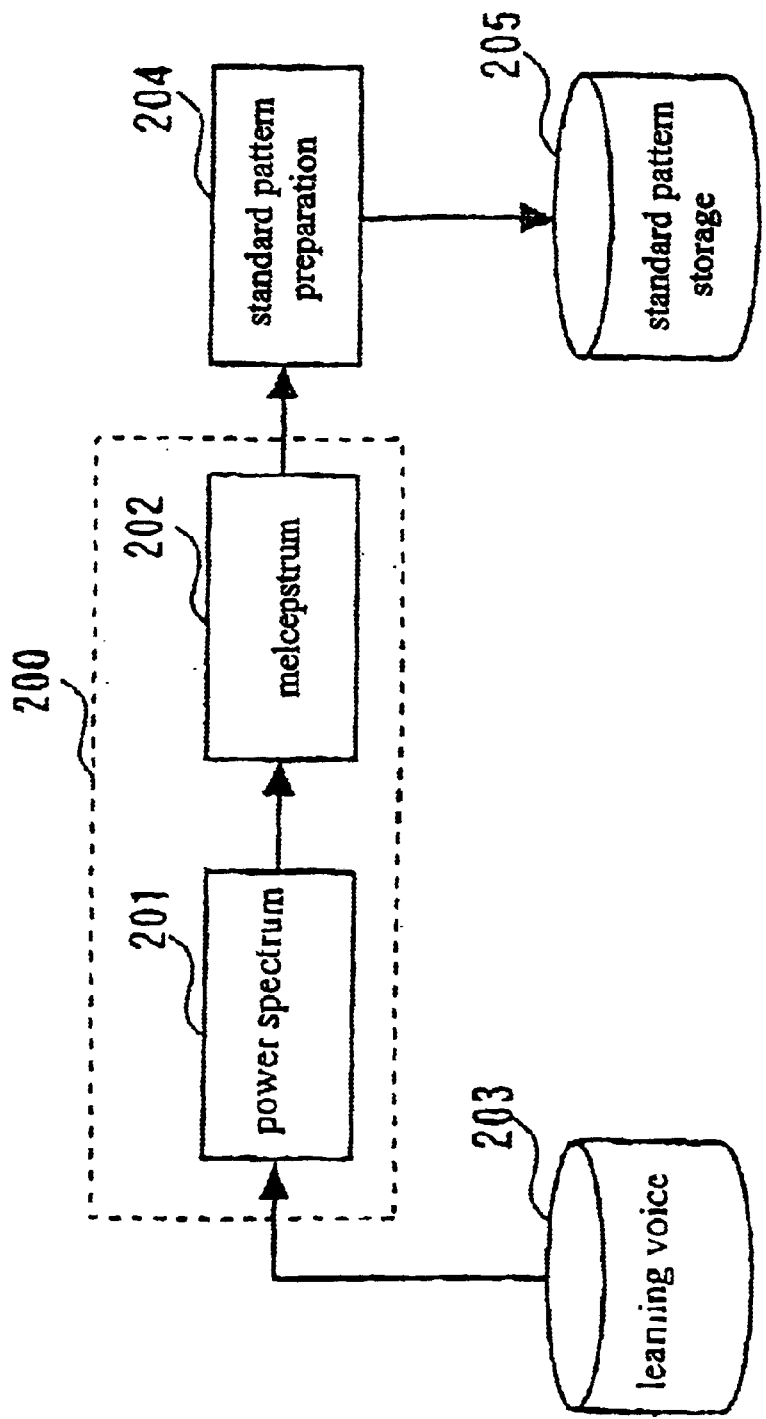
FIG. 2 is a block diagram illustrative of a conventional standard pattern preparation system.

A first aspect of the present invention is a speech recognition system for recognizing an input voice of a narrow frequency band. The speech recognition system includes: a frequency band converting unit for converting the input voice of the narrow frequency band into a pseudo voice of a wide frequency band which covers an entirety of the narrow frequency band and which is wider than the narrow frequency band.

It is preferable that the speech recognition system further includes: a power spectrum calculating unit for calculating power spectrums of the input voice of the narrow frequency band, and that the frequency band converting unit further comprises: a specific vector storing unit for storing specific vectors of power spectrums of a wide frequency band voice; an expansion coefficient calculating unit for calculating expansion coefficients that the power spectrums calculated by the power spectrum calculating unit are expanded by the specific vectors and a frequency band expansion unit for calculating additional power spectrums in a lack frequency band by use of the expansion coefficients calculated by the expansion coefficient calculating unit, where the lack frequency band is covered by the wide frequency band but not covered by the narrow frequency band, and the frequency band expansion unit combining the additional power spectrums in the lack frequency band into the power spectrum of the narrow frequency band calculated by the power spectrum calculating unit to prepare pseudo power spectrums of the pseudo voice of the wide frequency band.

It is also preferable to further include: a pattern reference unit for receiving an output from the frequency band converting unit and comparing the output with a standard pattern for carrying out the speech recognition.

It is also preferable to further include: a standard pattern storing unit for storing the standard patterns for allowing the pattern reference unit to compare the output with the standard pattern.

It is also preferable to further include: a standard pattern preparation unit for receiving an output from the frequency band converting unit and preparing a standard pattern based on the output for carrying out the speech recognition.

It is also preferable to further include: a standard pattern storing unit for storing the standard pattern prepared by the standard pattern preparation unit.

It is also preferable that the frequency band converting unit further comprises: a melcepstrum calculating unit for calculating a melcepstrum characteristic quantity based on the pseudo power spectrum prepared by the frequency band expansion unit.

A second aspect of the present invention is a standard pattern preparation system for preparing a standard pattern to recognize an input voice of a narrow frequency band. The standard pattern preparation system includes: a frequency band converting unit for converting the input voice of the narrow frequency band into a pseudo voice of a wide frequency band which covers an entirety of the narrow frequency band and which is wider than the narrow frequency band.

It is also preferable that the standard pattern preparation system further includes: a power spectrum calculating unit for calculating power spectrums of the input voice of the narrow frequency band, and that the frequency band converting unit further comprises: a specific vector storing unit for storing specific vectors of power spectrums of a wide frequency band voice; an expansion coefficient calculating unit for calculating expansion coefficients that the power spectrums calculated by the power spectrum calculating unit are expanded by the specific vectors; and a frequency band expansion unit for calculating additional power spectrums in a lack frequency band by use of the expansion coefficients calculated by the expansion coefficient calculating unit, where the lack frequency band is covered by the wide frequency band but not covered by the narrow frequency band, and the frequency band expansion unit combining the additional power spectrums in the lack frequency band into the power spectrum of the narrow frequency band calculated by the power spectrum calculating unit to prepare pseudo power spectrums of the pseudo voice of the wide frequency band.

It is also preferable to further include: a pattern reference unit for receiving an output from the frequency band converting unit and comparing the output with a standard pattern for carrying out the speech recognition.

It is also preferable to further include: a standard pattern storing unit for storing the standard patterns for allowing the pattern reference unit to compare the output with the standard pattern.

It is also preferable to further include: a standard pattern preparation unit for receiving an output from the frequency band converting unit and preparing a standard pattern based on the output for carrying out the speech recognition.

It is also preferable to further include: a standard pattern storing unit for storing the standard pattern prepared by the standard pattern preparation unit.

It is also preferable that the frequency band converting unit further comprises: a melcepstrum calculating unit for calculating a melcepstrum characteristic quantity based on the pseudo power spectrum prepared by the frequency band expansion unit.

A third aspect of the present invention is a characteristic extraction system for extracting a melcepstrum characteristic quantity of an input voice of a narrow frequency band. The characteristic extraction system includes: a power spectrum calculating unit for calculating power spectrums of the input voice of the narrow frequency band; a frequency band converting unit for converting the input voice of the narrow frequency band into a pseudo voice of a wide frequency band which covers an entirety of the narrow frequency band and which is wider than the narrow frequency band; and a melcepstrum calculating unit for calculating a melcepstrum characteristic quantity based on the pseudo voice of the wide frequency band.

It is also preferable that the frequency band converting unit further comprises: a specific vector storing unit for storing specific vectors of power spectrums of a wide frequency band voice; an expansion coefficient calculating unit for calculating expansion coefficients that the power spectrums calculated by the power spectrum calculating unit are expanded by the specific vectors; and a frequency band expansion unit for calculating additional power spectrums in a lack frequency band by use of the expansion coefficients calculated by the expansion coefficient calculating unit, where the lack frequency band is covered by the wide frequency band but not covered by the narrow frequency band, and the frequency band expansion unit combining the additional power spectrums in the lack frequency band into the power spectrum of the narrow frequency band calculated by the power spectrum calculating unit to prepare pseudo power spectrums of the pseudo voice of the wide frequency band.

A fourth aspect of the present invention is a speech recognition method for recognizing an input voice of a narrow frequency band. The speech recognition method includes the steps of: converting the input voice of the narrow frequency band into a pseudo voice of a wide frequency band which covers an entirety of the narrow frequency band and which is wider than the narrow frequency band.

It is also preferable to further include: calculating power spectrums of the input voice of the narrow frequency band; calculating expansion coefficients that the power spectrums are expanded by specific vectors; and calculating additional power spectrums in a lack frequency band by use of the expansion coefficients, where the lack frequency band is covered by the wide frequency band but not covered by the narrow frequency band, so as to combine the additional power spectrums in the lack frequency band into the power spectrum of the narrow frequency band, thereby to prepare pseudo power spectrums of the pseudo voice of the wide frequency band.

It is also preferable to further include: calculating a melcepstrum characteristic quantity based on the pseudo power spectrum.

It is also preferable to further include: comparing the melcepstrum characteristic quantity with a standard pattern for carrying out the speech recognition.

A fifth aspect of the present invention is a standard pattern preparation method for preparing a standard pattern to recognize an input voice of a narrow frequency band. The standard pattern preparation method includes the steps of: converting the input voice of the narrow frequency band into a pseudo voice of a wide frequency band which covers an entirety of the narrow frequency band and which is wider than the narrow frequency band.

It is also preferable to further include: calculating power spectrums of the input voice of the narrow frequency band; calculating expansion coefficients that the power spectrums are expanded by specific vectors; and calculating additional power spectrums in a lack frequency band by use of the expansion coefficients, where the lack frequency band is covered by the wide frequency band but not covered by the narrow frequency band, and combining the additional power spectrums in the lack frequency band into the power spectrum of the narrow frequency band to prepare pseudo power spectrums of the pseudo voice of the wide frequency band.

It is also preferable to further include: calculating a melcepstrum characteristic quantity based on the pseudo power spectrum.

It is also preferable to further include: comparing the melcepstrum characteristic quantity with a standard pattern for carrying out the speech recognition.

A sixth aspect of the present invention is a characteristic extraction method for extracting a melcepstrum characteristic quantity of an input voice of a narrow frequency band. The characteristic extraction method includes the steps of: calculating power spectrums of the input voice of the narrow frequency band; converting the input voice of the narrow frequency band into a pseudo voice of a wide frequency band which covers an entirety of the narrow frequency band and which is wider than the narrow frequency band; and calculating a melcepstrum characteristic quantity based on the pseudo voice of the wide frequency band.

It is also preferable to further include: calculating expansion coefficients that the power spectrums are expanded by specific vectors; and calculating additional power spectrums in a lack frequency band by use of the expansion coefficients, where the lack frequency band is covered by the wide frequency band but not covered by the narrow frequency band, and combining the additional power spectrums in the lack frequency band into the power spectrum of the narrow frequency band to prepare pseudo power spectrums of the pseudo voice of the wide frequency band.

In accordance with the present invention, the characteristic extraction unit for analyzing the input voice signal and extracting the characteristic quantity further includes a frequency band conversion unit for converting the narrow frequency band power spectrum into a wide frequency band power spectrum.

The frequency band conversion is executed for preparing the standard pattern in order to reduce the mismatch between the standard pattern and the input voice.

The characteristic extraction unit for analyzing the input voice signal and extracting the characteristic quantity further includes a frequency band conversion unit for converting the narrow frequency band power spectrum into a wide frequency band power spectrum. The frequency band conversion unit further includes a characteristic vector storing unit for storing characteristic vectors of a power spectrum of the wide frequency band voice. A plurality of power spectrums of the wide frequency band voice are gathered for carrying out a main component analysis to the power spectrums in order to prepare the characteristic vectors. The characteristic vectors are then stored in the characteristic vector storing unit. Any power spectrums of the wide frequency band voice are represented by a linear combination of the characteristic vectors.

Short time power spectrums of a narrow frequency band voice of the input voice signal are calculated by a power spectrum calculating unit. The frequency band conversion unit furthermore includes an expansion coefficient calculation unit for calculating an expansion coefficient, wherein the calculated power spectrum of the narrow frequency band is expanded by the characteristic vector of the wide frequency band stored in the characteristic vector storing unit.

The frequency band conversion unit moreover includes a frequency band expansion unit for calculating a pseudo wide frequency band voice power spectrum which is expanded by the expansion coefficient from the input narrow frequency band power spectrum. In details, the frequency band expansion unit calculates a power spectrum of a lack frequency band by utilizing the expansion coefficient, and combines the calculated power spectrum of the lack frequency band into the already calculated narrow frequency band spectrum, so that the frequency band expansion unit calculates the pseudo wide frequency band voice power spectrum.

The speech recognition system further includes a melcepstrum calculating unit for calculating the melcepstrum as the melcepstrum characteristic quantity by utilizing the above described pseudo wide frequency band voice power spectrum.

The expansion coefficient calculation process by the expansion coefficient calculation unit and the frequency band expansion process by the frequency band expansion unit may be realized by programs executed by the computer. The programs may be stored in a computer-readable storage medium such as a semiconductor memory or a magnetic recording medium.

First Embodiment

Figure 3:
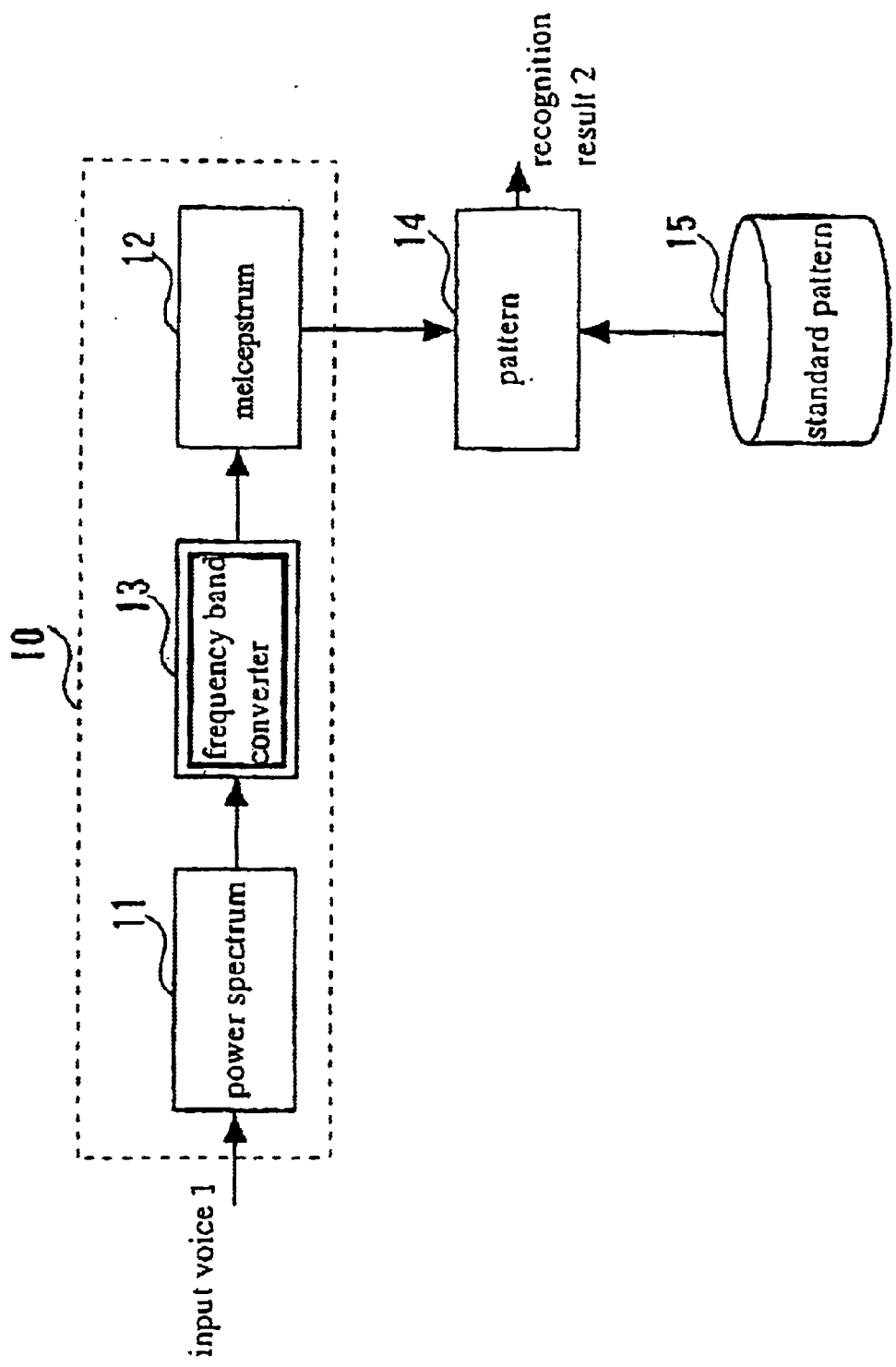
FIG. 3 is a block diagram illustrative of a first novel speech recognition system in a first embodiment in accordance with the present invention.

A first embodiment according to the present invention will be described in detail with reference to the drawings. FIG. 3 is a block diagram illustrative of a first novel speech recognition system in a first embodiment in accordance with the present invention.

The speech recognition system includes a characteristic extraction unit 10, a pattern reference unit 14. The characteristic extraction unit 10 receives an input of a voice 1 and performs the following processes. The pattern reference unit 14 receives the output from the characteristic extraction unit 10 and compares the output with a standard pattern 15 for the speech recognition.

Figure 4:
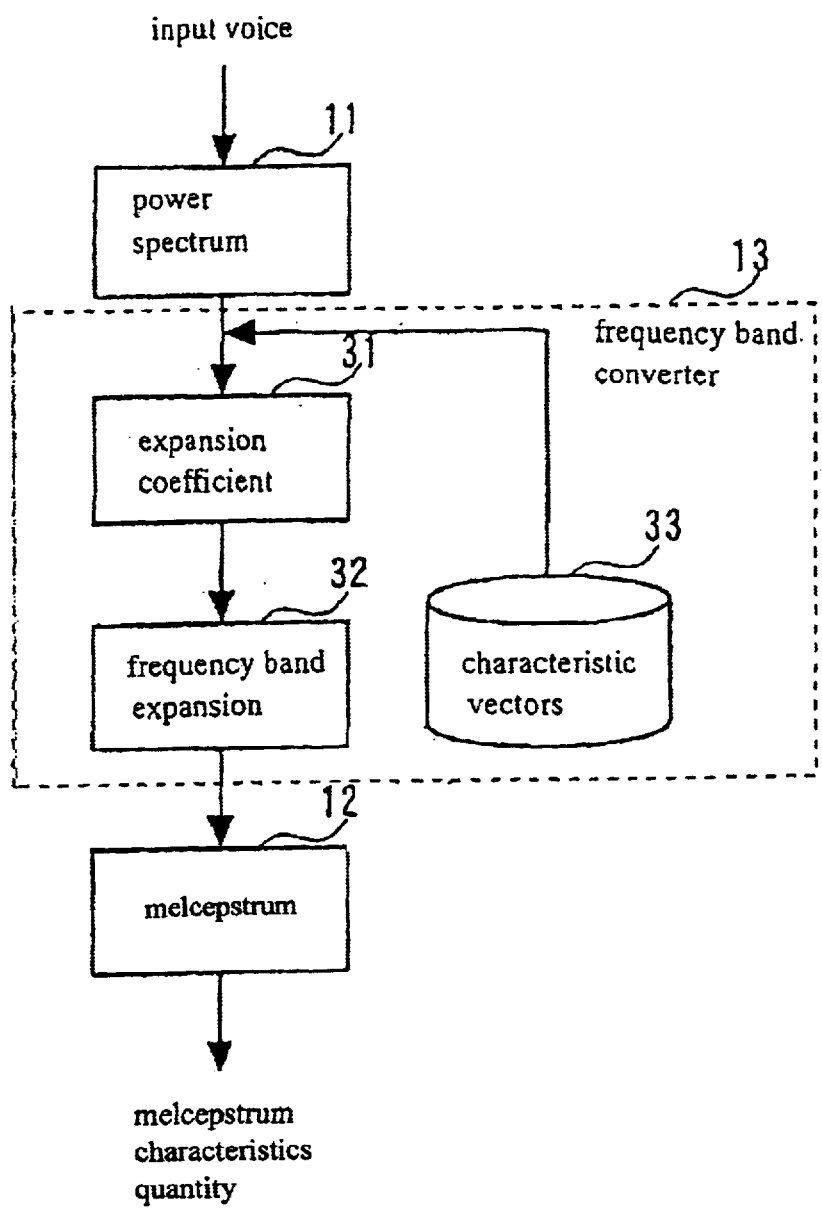
FIG. 4 is a block diagram illustrative of the structure of the characteristic extraction unit included in the novel speech recognition system of FIG. 3.

The characteristic extraction unit 10 is provided for analyzing the input voice signal 1 and extracting the characteristic quantity. The characteristic extraction unit 10 further includes a frequency band conversion unit 13 for converting the narrow frequency band power spectrum into a wide frequency band power spectrum. FIG. 4 is a block diagram illustrative of the structure of the characteristic extraction unit included in the novel speech recognition system of FIG. 3.

The frequency band conversion unit 13 further includes a characteristic vector storing unit 33 for storing characteristic vectors of a power spectrum of the wide frequency band voice. A plurality of power spectrums of the wide frequency band voice are gathered for carrying out a main component analysis to the power spectrums in order to prepare the characteristic vectors. The characteristic vectors are then stored in the characteristic vector storing unit 33. Any power spectrums of the wide frequency band voice are represented by a linear coupling of the characteristic vectors. Short time power spectrums of a narrow frequency band voice of the input voice signal are calculated by a power spectrum calculating unit. The frequency band conversion unit 13 furthermore includes an expansion coefficient calculation unit 31 for calculating an expansion coefficient, wherein the calculated power spectrum of the narrow frequency band is expanded by the characteristic vector of the wide frequency band stored in the characteristic vector storing unit 33.

The frequency band conversion unit 13 moreover includes a frequency band expansion unit 32 for calculating a pseudo wide frequency band voice power spectrum which is expanded by the expansion coefficient from the input narrow frequency band power spectrum. In details, the frequency band expansion unit 32 calculates a power spectrum of a lack frequency band by utilizing the expansion coefficient, and combines the calculated power spectrum of the lack frequency band into the already calculated narrow frequency band spectrum, so that the frequency band expansion unit 32 calculates the pseudo wide frequency band voice power spectrum.

With reference back to FIG. 3, the characteristic extraction unit 10 further includes a melcepstrum calculating unit 12 for calculating the melcepstrum as the melcepstrum characteristic quantity by utilizing the above described pseudo wide frequency band voice power spectrum.

The expansion coefficient calculation process by the expansion coefficient calculation unit 31 and the frequency band expansion process by the frequency band expansion unit 32 may be realized by programs executed by the computer. The programs may be stored in a computer-readable storage medium such as a semiconductor memory or a magnetic recording medium.

Operations of the above described novel speech recognition system will be described. The input voice 1 having a restricted narrow frequency band is inputted into the power spectrum calculating unit 11. The power spectrum calculating unit 11 calculates the narrow band power spectrums.

$$\{N(k)\}, k=K1{\sim}K2 \tag{1}$$

where N(k) is the power spectrum of the voice at a frequency "k", and K1~K2 correspond to upper and lower limits of the narrow band frequencies. In case of the telephone voice, K1 is 300 Hz and K2 is 3400 Hz.

The frequency band conversion unit 13 converts the narrow frequency band power spectrum into the wide frequency band power spectrum.

$$\{W(k)\}, k=K0{\sim}K3 \tag{2}$$

where W(k) is the power spectrum of the voice at a frequency "k", and K0~K3 correspond to upper and lower limits of the wide band frequencies.

$$K0<K1<K2<K3 \tag{3}$$

The melcepstrum calculating unit 12 calculates the melcepstrum by utilizing the wide frequency band power spectrum W(k) without utilizing the narrow frequency band power spectrum N(k). The voice informations in the narrow frequency band K0~K1 and the wide frequency band K2~K3 are utilized for improving the accuracy of the speech recognition.

With reference to FIG. 4, the characteristic vector storing unit 33 stores the characteristic vectors of the power spectrum of the wide frequency band voice.

$$i\ \{\phi(i,k)\}, i=1\sim M, k=K0\sim K3 \quad (4)$$

where "M" is the number of the characteristic vectors which have already been stored in the characteristic vector storing unit 33. The characteristic vectors have been prepared by gathering power spectrums of the wide frequency voice and the main component analysis.

The wide frequency band power spectrum W(k) may be represented by a linear combination of the characteristic vectors.

$$W(k) = \sum_{i=1}^{M} c(i)\phi(i, k), k = K0 \sim K3 \quad (5)$$

where c(i) is the expansion coefficient.

The expansion coefficient calculation unit 31 calculates the expansion coefficient, wherein the narrow frequency band power spectrum {N(k)} from the power spectrum calculating unit 11 is expanded by the characteristic vector of the wide frequency band power spectrum stored in the characteristic vector storing unit 33.

$$\{N(k)\}, k=K1\sim K2 \quad (6)$$

The expansion coefficient b(i) is calculated to minimize the squared error "E" represented by:

$$E = \sum_{k=K1}^{K2} \left\{ N(k) - \sum_{i=1}^{M} (b(i)\phi(i, k)) \right\}^2 \quad (7)$$

The frequency band expansion unit 32 receives the expansion coefficient b(i) from the expansion coefficient calculation unit 31, and calculates the wide frequency band power spectrum W(k) by use of the following equation including the expansion coefficient b(i).

$$W(k) = \sum_{i=1}^{M} b(i)\phi(i, k), k = K0 \sim K3 \quad (8)$$

The melcepstrum calculating unit 12 receives the wide frequency band power spectrum W(k) from the frequency band expansion unit 32, and calculates the melcepstrum characteristic quantity.

In the above description, the expansion coefficient b(i) is calculated to minimize the above described squared error "E". Alternatively, the expansion coefficient b(i) may optionally be calculated to maximize the likelihood of Hidden Markov Model to the input voice.

It is also possible that both the narrow frequency band power spectrum and the wide frequency band power spectrum are calculated from the voice received in both the narrow and wide frequency bands. In the narrow frequency band, the narrow frequency band power spectrum is used. For the lack frequency region in the narrow frequency band, parts of the wide frequency band power spectrum corresponding to the lack frequency region are combined into the narrow frequency band power spectrum, so that the combination of the narrow frequency band power spectrum with the parts of the wide frequency band power spectrum form the wide frequency band power spectrum. The wide frequency band power spectrum is then subjected to the main component analysis to obtain the specific vectors. These specific vectors may be used for calculating the wide frequency band power spectrum W(k).

Second Embodiment

Figure 5:
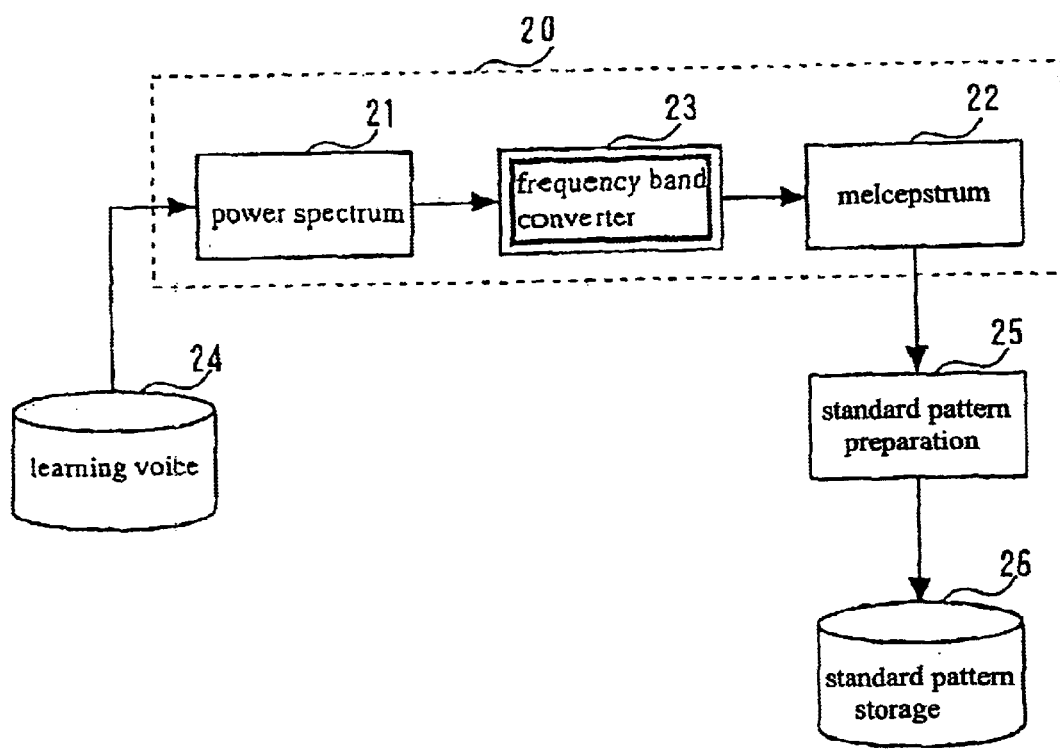
FIG. 5 is a block diagram illustrative of a first novel speech recognition system in a second embodiment in accordance with the present invention.

A second embodiment according to the present invention will be described in detail with reference to the drawings. FIG. 5 is a block diagram illustrative of a first novel speech recognition system in a second embodiment in accordance with the present invention.

The speech recognition system includes a learning voice storing unit 24, a characteristic extraction unit 20, a standard pattern preparation unit 25. The characteristic extraction unit 20 receives an input of a voice and performs the following processes. The standard pattern preparation unit 25 receives the output from the characteristic extraction unit 20 and prepares a standard pattern 26 for the speech recognition.

Figure 6:
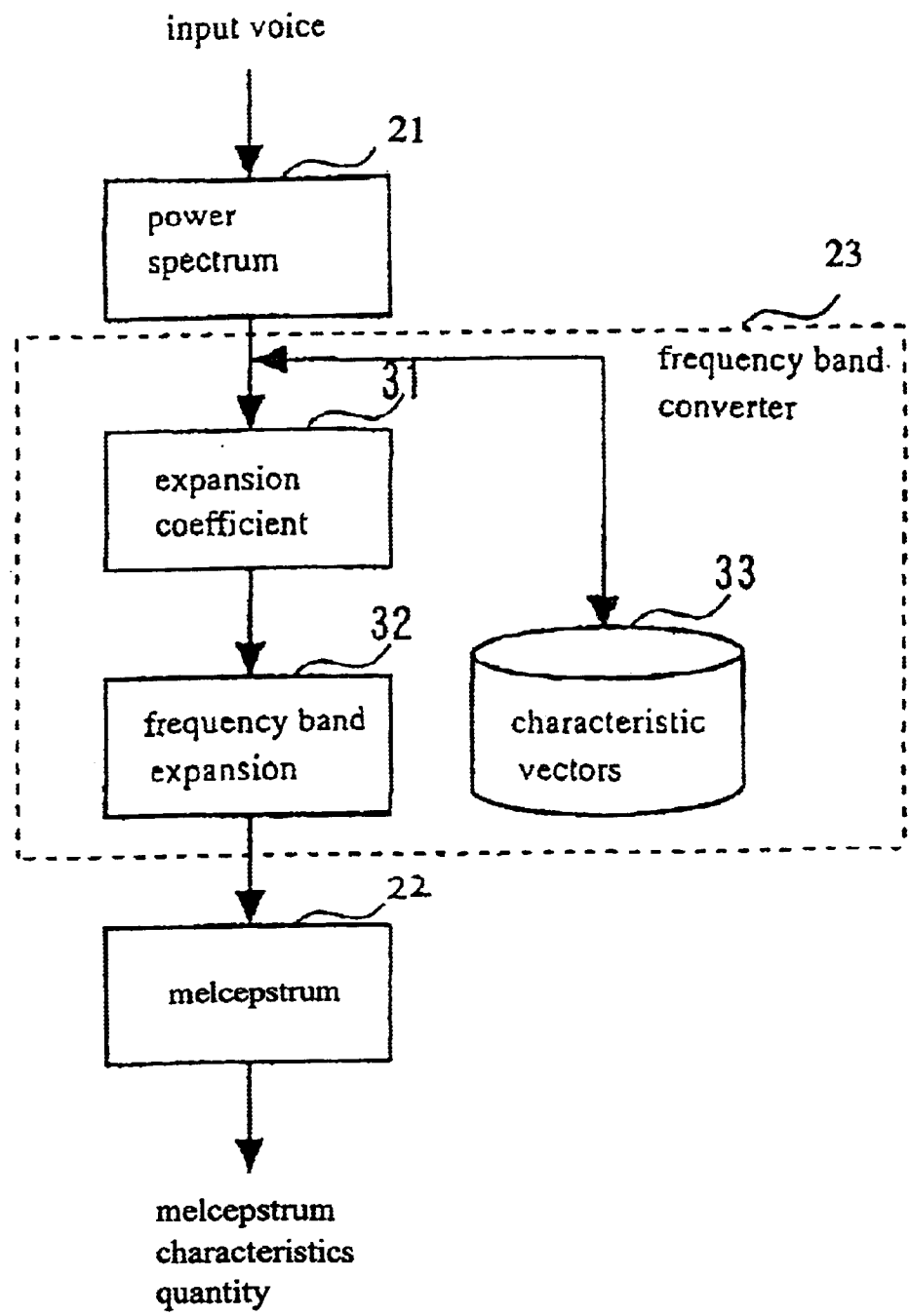
FIG. 6 is a block diagram illustrative of the structure of the characteristic extraction unit included in the novel speech recognition system of FIG. 5.

The characteristic extraction unit 20 further includes a frequency band conversion unit 23 for converting the narrow frequency band power spectrum into a wide frequency band power spectrum. FIG. 6 is a block diagram illustrative of the structure of the characteristic extraction unit included in the novel speech recognition system of FIG. 5.

The frequency band conversion unit 23 further includes the characteristic vector storing unit 33 for storing characteristic vectors of a power spectrum of the wide frequency band voice. A plurality of power spectrums of the wide frequency band voice are gathered for carrying out a main component analysis to the power spectrums in order to prepare the characteristic vectors. The characteristic vectors are then stored in the characteristic vector storing unit 33. Any power spectrums of the wide frequency band voice are represented by a linear coupling of the characteristic vectors. Short time power spectrums of a narrow frequency band voice of the input voice signal are calculated by a power spectrum calculating unit.

The frequency band conversion unit 23 furthermore includes the expansion coefficient calculation unit 31 for calculating an expansion coefficient, wherein the calculated power spectrum of the narrow frequency band is expanded by the characteristic vector of the wide frequency band stored in the characteristic vector storing unit 33.

The frequency band conversion unit 23 moreover includes the frequency band expansion unit 32 for calculating a pseudo wide frequency band voice power spectrum which is expanded by the expansion coefficient from the input narrow frequency band power spectrum. In details, the frequency band expansion unit 32 calculates a power spectrum of a lack frequency band by utilizing the expansion coefficient, and combines the calculated power spectrum of the lack frequency band into the already calculated narrow frequency band spectrum, so that the frequency band expansion unit 32 calculates the pseudo wide frequency band voice power spectrum.

With reference back to FIG. 5, the characteristic extraction unit 20 further includes the melcepstrum calculating unit 22 for calculating the melcepstrum as the melcepstrum characteristic quantity by utilizing the above described pseudo wide frequency band voice power spectrum. The structure of the frequency band conversion unit 23 is substantially the same as in the first embodiment with reference to FIG. 4.

The standard pattern preparation unit 25 prepares the standard pattern based on the wide frequency band power spectrums of the voice to improve the accuracy of the standard pattern.

The learning voice storing unit 24 may store both the narrow frequency band voice and the wide frequency band voice. If the wide frequency band voice is stored in the learning voice storing unit 24, then a narrow frequency part is extracted from the wide frequency band power spectrum, and this extracted narrow frequency part is then converted by the frequency band conversion unit 23 into the pseudo wide frequency band power spectrum.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A speech recognition system for recognizing an input voice of a narrow frequency band, said speech recognition system including:
    a power spectrum calculating unit for calculating power spectrums of said input voice of said narrow frequency band;
    a frequency band converting unit for converting said input voice of said narrow frequency band into a pseudo voice of a wide frequency band which covers an entirety of said narrow frequency band and which is wider than said narrow frequency band, said frequency band converting unit comprising:
        i. a eigen-vector storing unit for storing a plurality of eigen vectors of power spectrums of said wide frequency band pseudo voice;
        ii. an expansion coefficient calculating unit for calculating expansion coefficients that said power spectrums calculated by said power spectrum calculating unit are expanded by a linear combination of said plurality of eigen vectors;
        iii. a frequency band expansion unit for calculating additional power spectrums in a lack frequency band by use of said expansion coefficients calculated by said expansion coefficient calculating unit, where said lack frequency band is covered by said wide frequency band but not covered by said narrow frequency band, and said frequency band expansion unit combining said additional power spectrums in said lack frequency band into said power spectrum of said narrow frequency band calculated by said power spectrum calculating unit to prepare pseudo power spectrums of said pseudo voice of said wide frequency band; and
        iv. a melcepstrum calculating unit for calculating a melcepstrum characteristic quantity based on said pseudo power spectrum prepared by said frequency band expansion unit;
    a pattern reference unit for receiving an output from said frequency band converting unit and comparing said output with a standard pattern for carrying out the speech recognition;
    a standard pattern preparation unit for receiving an output from said frequency band converting unit and preparing the standard pattern based on said output for carrying out the speech recognition; and
    a standard pattern storing unit for storing the standard pattern prepared by the standard pattern preparation unit for allowing said pattern reference unit to compare said output with said standard pattern.

2. A standard pattern preparation system for preparing a standard pattern to recognize an input voice of a narrow frequency band, said standard pattern preparation system including:
    a power spectrum calculating unit for calculating power spectrums of said input voice of said narrow frequency band;
    a frequency band converting unit for converting said input voice of said narrow frequency band into a pseudo voice of a wide frequency band which covers an entirety of said narrow frequency band and which is wider than said narrow frequency band, said frequency band converting unit comprising:
        i. an eigen vector storing unit for storing a plurality of eigen vectors of power spectrums of said wide frequency band voice;
        ii. an expansion coefficient calculating unit for calculating expansion coefficients that said power spectrums calculated by said power spectrum calculating unit are expanded by a linear combination of said plurality of eigen vectors; and
        iii. a frequency band expansion unit for calculating additional power spectrums in a lack frequency band by use of said expansion coefficients calculated by said expansion coefficient calculating unit, where said lack frequency band is covered by said wide frequency band but not covered by said narrow frequency band, and said frequency band expansion unit combining said additional power spectrums in said lack frequency band into said power spectrum of said narrow frequency band calculated by said power spectrum calculating unit to prepare pseudo power spectrums of said pseudo voice of said wide frequency band; and
        iv. a melcepstrum calculating unit for calculating a melcepstrum characteristic quantity based on said pseudo power spectrum prepared by said frequency band expansion unit;
    a pattern reference unit for receiving an output from said frequency band converting unit and comparing said output with a standard pattern for carrying out the speech recognition;
    a standard pattern preparation unit for receiving an output from said frequency band converting unit and preparing the standard pattern based on said output for carrying out the speech recognition; and
    a standard pattern storing unit for storing the standard pattern prepared by the standard pattern preparation unit for allowing said pattern reference unit to compare said output with said standard pattern.

3. A speech recognition method for recognizing an input voice of a narrow frequency band, said speech recognition method including the steps of:
    a. calculating power spectrums of said input voice of said narrow frequency band;
    b. converting said input voice of said narrow frequency band into a pseudo voice of a wide frequency band which covers an entirety of said narrow frequency band and which is wider than said narrow frequency band;
    c. calculating expansion coefficients that said power spectrums are expanded by a linear combination of a plurality of eigen vectors of said power spectrums of said wide frequency band voice;
    d. calculating additional power spectrums in a lack frequency band by use of said expansion coefficients, where said lack frequency band is covered by said wide frequency band but not covered by said narrow frequency band, so as to combine said additional power spectrums in said lack frequency band into said power spectrum of said narrow frequency band thereby to prepare pseudo power spectrums of said pseudo voice of said wide frequency band;

e. calculating a melcepstrum characteristic quantity based on said pseudo power spectrum; and f. comparing said melcepstrum characteristic quantity with a standard pattern for carrying out the speech recognition.

4. A standard pattern preparation method for preparing a standard pattern to recognize an input voice of a narrow frequency band, said standard pattern preparation method including the steps of:

a. calculating power spectrums of said input voice of said narrow frequency band;

b. converting said input voice of said narrow frequency band into a pseudo voice of a wide frequency band which covers an entirety of said narrow frequency band and which is wider than said narrow frequency band; and c. calculating expansion coefficients that said power spectrums are expanded by a linear combination of a plurality of eigen vectors of said power spectrums of said wide frequency band voice;

d. calculating additional power spectrums in a lack frequency band by use of said expansion coefficients, where said lack frequency band is covered by said wide frequency band but not covered by said narrow frequency bands and combining said additional power spectrums in said lack frequency band into said power spectrum of said narrow frequency band to prepare pseudo power spectrums of said pseudo voice of said wide frequency band;

e. receiving said pseudo voice and preparing a standard pattern based on said output for carrying out speech recognition;

f. calculating a melcepstrum characteristic quantity based on said pseudo power spectrum; and g. comparing said melcepstrum characteristic quantity with a standard pattern for carrying out the speech recognition.

* * * * *